US008052159B2

(12) United States Patent
Chen

(10) Patent No.: US 8,052,159 B2
(45) Date of Patent: Nov. 8, 2011

(54) MOTORCYCLE SIDE KICKSTAND DOLLY

(76) Inventor: Tung Ming Chen, Donggang Township, Pingtung County (TW)

(*) Notice: Subject to any disclaimer, the term of this patent is extended or adjusted under 35 U.S.C. 154(b) by 264 days.

(21) Appl. No.: 12/580,793

(22) Filed: Oct. 16, 2009

(65) Prior Publication Data

US 2011/0089662 A1    Apr. 21, 2011

(51) Int. Cl.
  *B62B 1/00*    (2006.01)
  *B62B 5/00*    (2006.01)
(52) U.S. Cl. .................. 280/79.11; 280/79.4; 414/426; 414/430
(58) Field of Classification Search ............... 280/47.23, 280/2, 79.11, 79.2, 79.4, 79.5, 32.6; 414/426, 414/430
See application file for complete search history.

(56) References Cited

U.S. PATENT DOCUMENTS

| | | | | |
|---|---|---|---|---|
| 1,804,997 A * | 5/1931 | Manley | .......... | 280/79.3 |
| 2,102,674 A * | 12/1937 | Brown | .......... | 414/430 |
| 2,246,882 A * | 6/1941 | Gentry | .......... | 414/426 |
| 2,277,787 A * | 3/1942 | Marcus | .......... | 414/234 |
| 2,610,750 A * | 9/1952 | Hulbert | .......... | 414/430 |
| 2,627,425 A * | 2/1953 | McNamara | .......... | 280/62 |
| 2,969,245 A * | 1/1961 | Wilson | .......... | 280/641 |
| 3,582,103 A * | 6/1971 | Schoning | .......... | 280/79.4 |
| 4,465,421 A * | 8/1984 | Murillo | .......... | 414/430 |
| D296,597 S * | 7/1988 | Adams | .......... | D34/23 |
| 4,784,402 A * | 11/1988 | Roman | .......... | 280/79.4 |
| 4,875,694 A * | 10/1989 | Hamrick | .......... | 280/32.6 |
| 5,609,461 A * | 3/1997 | Lichtenberg | .......... | 414/426 |
| 5,984,339 A * | 11/1999 | Guild | .......... | 280/402 |
| 6,095,746 A * | 8/2000 | Bergin | .......... | 414/430 |
| 6,109,494 A * | 8/2000 | Pilmore | .......... | 224/547 |
| 6,186,727 B1 * | 2/2001 | Hamilton | .......... | 414/426 |
| 6,287,069 B1 * | 9/2001 | Oliphant et al. | .......... | 414/426 |
| 6,386,560 B2 * | 5/2002 | Calender | .......... | 280/47.34 |
| 6,439,346 B1 * | 8/2002 | Gradziuk | .......... | 187/216 |
| 6,935,619 B2 * | 8/2005 | Chamoun | .......... | 254/10 B |
| 6,988,586 B1 * | 1/2006 | Perez | .......... | 182/21 |
| 7,097,406 B1 * | 8/2006 | Gang | .......... | 414/429 |
| 7,156,403 B2 * | 1/2007 | Abbott | .......... | 280/79.11 |
| 7,278,647 B1 * | 10/2007 | Keenan et al. | .......... | 280/79.11 |
| 7,284,942 B1 * | 10/2007 | Allen | .......... | 414/430 |
| 7,325,816 B2 * | 2/2008 | Johnson | .......... | 280/79.4 |

(Continued)

FOREIGN PATENT DOCUMENTS

CN    2238115 Y    10/1996

*Primary Examiner* — Jeffrey J Restifo
*Assistant Examiner* — Jacob Meyer
(74) *Attorney, Agent, or Firm* — Morris Manning Martin LLP; Tim Tingkang Xia, Esq.

(57) ABSTRACT

A motorcycle side kickstand dolly used with one or two conventional wheel dollies that allows a medium to large motorcycle to be mounted easily on the dollies and moved easily to any desired position on a horizontal surface. The motorcycle side kickstand dolly in accordance with the present invention comprises an H-frame support panel, a side kickstand brace and four wheels. The H-frame support panel comprises a low-slung panel and four protrusions. The low-slung panel has four corners. The protrusions are formed respectively on the corners and protrude up and out from the corners. The side kickstand brace is mounted on the low-slung panel between two adjacent protrusions and has an upper edge, a recess and a strengthening lip. The recess is formed downward from the upper edge. The strengthening lip is formed on and protrudes transversely from the upper edge. The wheels are mounted rotatably respectively under the protrusions.

2 Claims, 3 Drawing Sheets

U.S. PATENT DOCUMENTS

| | | | |
|---|---|---|---|
| 7,543,830 B2 * | 6/2009 | Symiczek | 280/79.11 |
| 7,600,767 B2 * | 10/2009 | Lewis | 280/79.7 |
| 7,784,760 B2 * | 8/2010 | Ramsey | 248/349.1 |
| D636,140 S * | 4/2011 | Cavanaugh | D34/23 |
| 2001/0031192 A1 * | 10/2001 | Hamilton | 414/426 |
| 2002/0119035 A1 * | 8/2002 | Hamilton | 414/426 |
| 2003/0038439 A1 * | 2/2003 | Novak et al. | 280/79.7 |
| 2005/0017470 A1 * | 1/2005 | Abbott | 280/79.4 |
| 2005/0284826 A1 * | 12/2005 | Johnson | 211/20 |
| 2007/0286714 A1 * | 12/2007 | Frost | 414/592 |
| 2009/0250898 A1 * | 10/2009 | Chen | 280/293 |
| 2011/0089654 A1 * | 4/2011 | Chen | 280/79.11 |
| 2011/0089662 A1 * | 4/2011 | Chen | 280/293 |
| 2011/0193039 A1 * | 8/2011 | Brakhage et al. | 254/8 R |

* cited by examiner

MOTORCYCLE SIDE KICKSTAND DOLLY

FIELD OF THE INVENTION

The invention is a motorcycle side kickstand dolly used with one or two conventional wheel dollies so a motorcycle can be mounted easily on one or two wheel dollies and the dolly and moved easily to any desired position on a horizontal surface.

BACKGROUND OF THE INVENTION

Motorcycles are important vehicles in many cultures and can be generally categorized as light motorcycles and heavy motorcycles. Manually moving motorcycles is strenuous because motorcycles are heavy, especially large motorcycles.

In a motorcycle shop or showroom, heavy motorcycles must be moved and adjusted to good exhibition positions. Large motorcycles are heavy and are not easy to move into confined spaces so they must be lifted by and moved with jacks or other heavy duty lifting devices. However, space in a motorcycle shop or showroom is usually limited, and moving heavy motorcycles is inconvenient.

Furthermore, a person having a car and a large motorcycle often parks the car and motorcycle in a garage. Most garages have a narrow parking area that is long enough to park a large motorcycle in front of the car. After the motorcycle is driven into the garage, the motorcycle needs to be turned around so it can be driven easily out of the garage. However, a large motorcycle is difficult to turn around because of limited space in the garage and the weight of the motorcycle. P.R.C. Patent No. CN2238115Y published on Oct. 23, 1996, titled "Ground Sliding Creeper for Repairing Car" disclosed a creeper having a front board, a rear board, a front roller, a rear roller, two front wheels and two rear wheels. The rear board is connected to the front board. The front roller is mounted under the front board and has two ends. The rear roller is mounted under the rear board and has two ends. The two front wheels are mounted respectively on the ends of the front roller. The two rear wheels are mounted respectively on the ends of the rear roller. A person lies on the ground sliding creeper under a car and moves back and forth to a desired position to repair the car. However, the ground sliding creeper cannot be used to move a large motorcycle.

SUMMARY OF THE INVENTION

The main objective of the present invention is to provide a motorcycle side kickstand dolly used with one or two conventional wheel dollies that allows a medium to large motorcycle to be mounted easily on the dollies and moved easily to any desired position on a horizontal surface such as a showroom floor or storage area.

A motorcycle side kickstand dolly in accordance with the present invention comprises an H-frame support panel, a side kickstand brace and four wheels. The H-frame support panel comprises a low-slung panel and four protrusions. The low-slung panel is rectangular and symmetrical and has four corners. The protrusions are formed respectively on the corners and protrude up and out from the corners. The side kickstand brace is mounted on the low-slung panel between two adjacent protrusions and has an upper edge, a recess and a strengthening lip. The recess is formed in and protrudes downward from the upper edge. The strengthening lip protrudes transversely from the upper edge is parallel to the low-slung panel. The four wheels are mounted rotatably respectively under the four protrusions.

DETAILED DESCRIPTION OF THE PRESENT INVENTION

Figure 1:
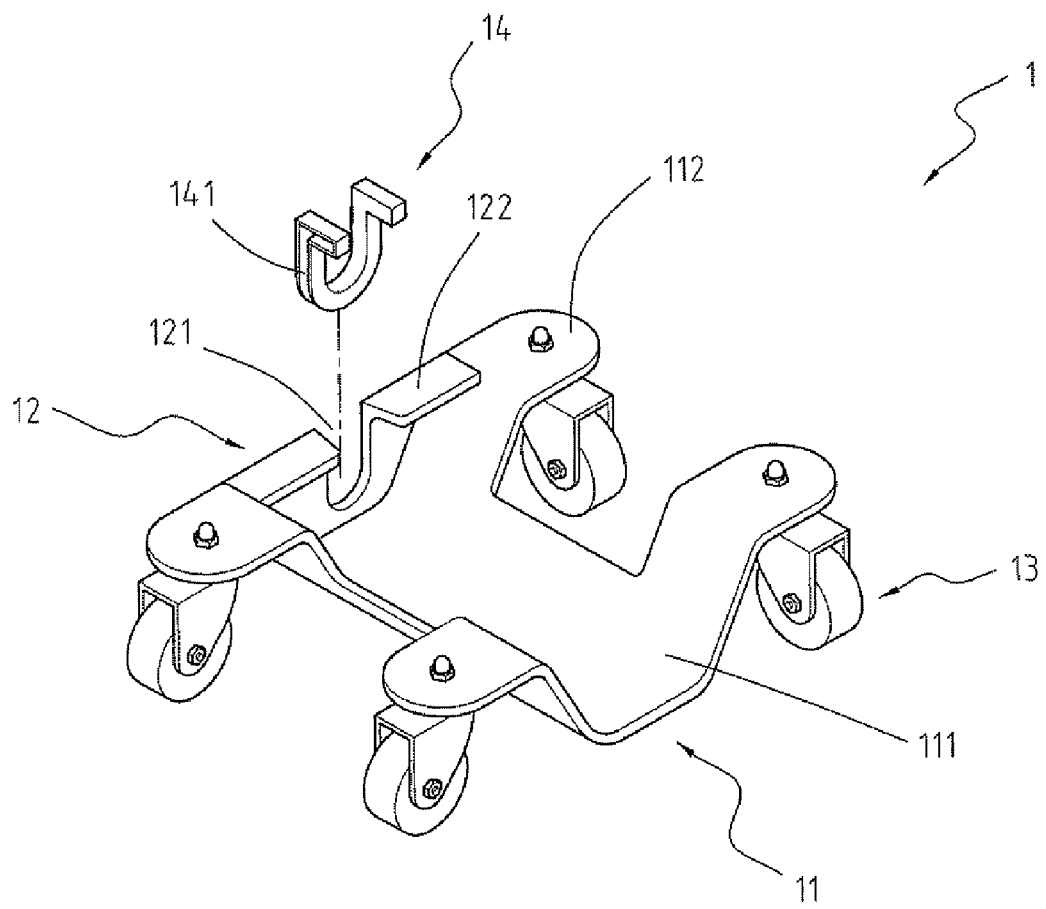
FIG. 1 is a partially exploded perspective view of a motorcycle dolly to support a side kickstand in accordance with the present invention.
Figure 2:
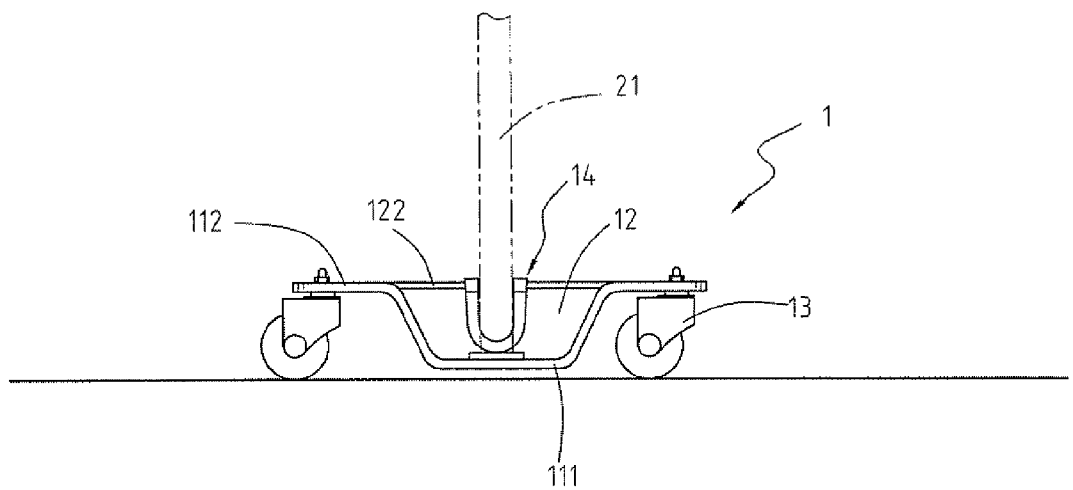
FIG. 2 is an operational side view of the motorcycle dolly in FIG. 1 with a side kickstand mounted on the dolly.
Figure 3:
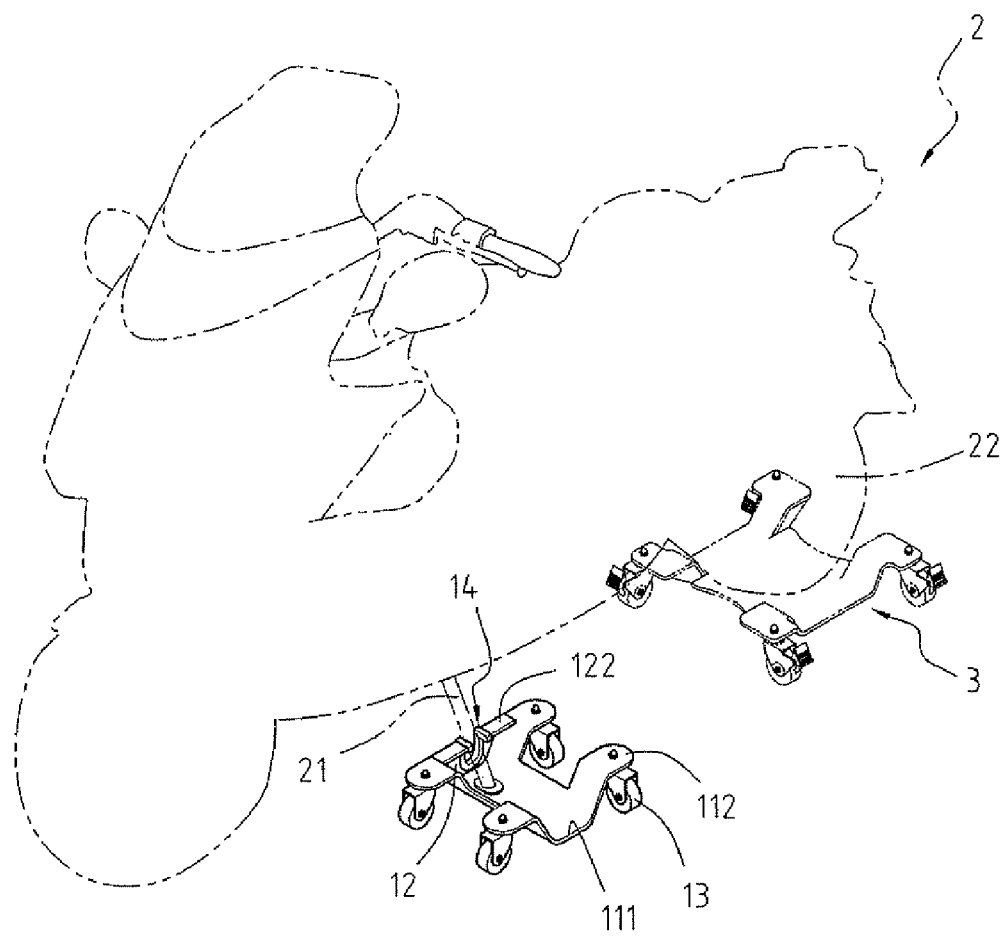
FIG. 3 is an operational perspective view of the motorcycle dolly in FIG. 1.

With reference to FIGS. 1, 2 and 3, a motorcycle side kickstand dolly (1) in accordance with the present invention is used with one or two conventional wheel dollies (3) so a motorcycle (2) can be mounted easily on the dollies (1, 3) and moved easily to any desired position on a horizontal surface is mounted under a side kickstand (21) when a wheel dolly (3) is mounted under a rear wheel (22) of the motorcycle (2) and comprises an H-frame support panel (11), a side kickstand brace (12), four wheels (13) and an optional recess jacket (14).

The H-frame support panel (11) comprises a low-slung panel (111) and four protrusions (112). The low-slung panel (111) is rectangular and symmetrical and has four corners. The four protrusions (112) are formed respectively on the corners of the low-slung panel (111) and protrude up and out from the corners.

The side kickstand brace (12) is mounted on the low-slung panel (111) between two adjacent protrusions (112) to hold the side kickstand (21) securely and has an upper edge, a recess (121) and a strengthening lip (122). The recess (121) is formed downward from the upper edge to hold the side kickstand (21) securely when the motorcycle (2) is held in position by the side kickstand (21). The strengthening lip (122) is formed on and protrudes transversely from the upper edge toward and parallel to the low-slung panel (111).

The wheels (13) are mounted rotatably respectively under the protrusions (112) so the motorcycle (2) can be moved easily in any direction to any desired position when the side kickstand (21) is mounted securely in the recess (121) and after the motorcycle wheel dolly (3) is mounted under the rear wheel (22).

The recess jacket (14) is U-shaped, corresponds to the recess (121) and is mounted in the recess (121) to prevent the side kickstand (21) from being scraped by the recess (121) and strengthening lip (122) and has an edge and a groove (141). The groove (141) is formed in the edge.

A person knowledgeable in the art will understand that various changes could be made without departing from the broad spirit and scope of the invention. The above-described embodiment is intended to illustrate the present invention and not to limit the scope of the present invention.

What is claimed is:

1. A motorcycle side kickstand dolly used with one or two conventional wheel dollies so a motorcycle can be mounted easily on the dollies and moved easily to any desired position on a horizontal surface, being mounted under a side kickstand when a wheel dolly is mounted under a rear wheel of the motorcycle and comprising
   an H-frame support panel comprising
      a low-slung panel being rectangular and symmetrical and having four corners;

four protrusions being formed respectively on the corners of the low-slung panel and protruding up and out from the corners; and a side kickstand brace being mounted on the low-slung panel between two adjacent protrusions and having an upper edge;

a recess being formed downward from the upper edge; and a strengthening lip being formed on and protruding transversely from the upper edge toward and parallel to the low-slung panel; and four wheels being mounted rotatably respectively under the four protrusions.

2. The motorcycle side kickstand dolly as claimed as claim 1 further comprises a recess jacket corresponding to the recess and being mounted in the recess and having an edge; and a groove being formed in the edge.

* * * * *